United States Patent Office 3,212,863
Patented Oct. 19, 1965

3,212,863
RECOVERY OF POTASSIUM CHLORIDE FROM AQUEOUS SOLUTIONS
Robert D. Goodenough, Midland, and Ronald H. Cooper, Clare, Mich., assignors to The Dow Chemical Company, Midland, Mich., a corporation of Delaware
No Drawing. Filed June 3, 1963, Ser. No. 284,814
9 Claims. (Cl. 23—300)

This invention relates to the recovery of potassium chloride from aqueous solutions containing potassium chloride and other alkali metal and alkaline earth salts.

The principal object of the present invention is to provide a process for recovering potassium chloride from aqueous mixtures containing said chloride.

Through the work leading up to the present invention, it has been found that by admixing ammonia with aqueous solutions containing potassium chloride and a substantial amount of calcium chloride, significant amounts, depending on the relative concentrations of said chlorides in the solution, of potassium chloride can be recovered therefrom having a high degree of purity. In addition, with further processing, the purity of said recovered potassium chloride can be substantially increased to produce a grade thereof more than sufficient for its use in commercial fertilizers.

The present invention, then, consists of a process for recovering the potassium chloride values from an aqueous mixture, such as, for example, natural, production, or effluent filtrate brines, the latter as described below, containing at least about 1 percent by weight potassium chloride and at least 20 percent by weight calcium chloride which comprises in general, admixing an amount of liquid or gaseous ammonia with said aqueous solution or brine, hereinafter referred to sometimes as feed brine, at a temperature of from about 50° C. to about minus 70° C., sufficient to provide a concentration of ammonia of from about 10 to about 40 percent by weight of the final solution or brine, thereby forming an ammoniacal slurry containing solid potassium chloride in a calcium chloride rich aqueous mother liquor; separating the solid potassium chloride from the so-formed ammoniacal slurry; purifying the so-separated potassium chloride as, for example, by washing with water, and, as an optional step, drying the purified potassium chloride to remove the excess water therefrom to obtain substantially dry free-flowing crystals of potassium chloride.

The term "final solution" is used herein to mean the mother liquor obtained on separating the potassium chloride from the slurry produced by the addition of ammonia, as above described, to the aqueous solution or brine to be treated.

Concentration of the aqueous solution or brine to be treated under the present process may be necessary to obtain a feed brine having a concentration therein of calcium chloride and potassium chloride, as stated above. If so, concentration is normally accomplished by evaporation at a temperature of from about 75° C. to about 125° C. Thus, concentrated, the feed brine is filtered and adjusted as to pH to an apparent pH value of from about 1 to about 9, preferably to about 5 to 7 using hydrochloric acid and then introduced into the ammoniation reactor. The term "apparent pH value" as used herein refers to pH values determined by use of a conventional pH meter having a glass electrode with a calomel reference electrode.

Preferably, the feed brine prior to ammoniation should be saturated with respect to at least calcium chloride and, if possible, also with respect to potassium chloride.

The potassium chloride precipitate obtained on ammoniation of the feed brine and prior to purifying, as by washing, is from about 70 to about 85 percent pure, the impurity being due primarily to the calcium chloride and to a minor extent to sodium chloride in the motor liquor, some of which adheres to said precipitate in the separation step. This calcium chloride forms a double salt (KCl·CaCl) with the potassium chloride in the precipitate when dried at a temperature above 37.7° C. The amount of the sodium chloride impurity normally does not exceed about 0.5 percent by weight of the recovered unwashed dried precipitate. These impurities of calcium chloride and sodium chloride can be easily and substantially removed by washing the precipitate with water.

In order to obtain the above said concentration of ammonia in the final solution, from about 11 to about 67 pounds of ammonia per hundred pounds of aqueous solution or brine to be treated may be added, the amount employed within these limits being in an increasing substantially direct relationship to the temperature increase (centigrade degrees) within the specified range and in a substantially inverse relationship to the decrease in the weight percentage of the calcium chloride concentration in said solution or brine to be treated. It is preferable, therefore, to operate the process of the present invention using a feed brine which is highly concentrated with respect to calcium chloride and desirably containing as much potassium chloride as possible, the temperature to be employed being, within the above stated range but as near the lower limit as practically possible.

In determining the amount of ammonia within the above range to be added in order to obtain the desired ammonia concentration in the so ammoniated solution, periodic samples of the solution are normally withdrawn during the addition of the ammonia and tested, for example, by chemical analysis. The addition of ammonia is then adjusted accordingly. With sufficient experience in operating under the various conditions of the process, however, predetermined amounts of ammonia known to produce a certain weight percent thereof in the solution being ammoniated can be added without periodically testing the solution.

It should be noted that care must be taken to be sure that the ammonia concentration in the solution being ammoniated is within the above stated range, for if it is below a concentration generally of about 10 to 15 percent by weight there forms a precipitate along with potassium chloride comprising calcium hydroxide and calcium hydroxychloride which, of course, serves to contaminate the potassium chloride. A concentration in excess of about 10 percent ammonia, however, dissolves these contaminating precipitates leaving substantially potassium chloride as the main, if not the only, constituent in the solid phase precipitated from the ammoniated solution. Likewise, of ammonia, similar contaminating precipitates again form.

Optimum recovery of potassium chloride was found to be obtained by admixing ammonia with the solution or brine to be treated in amount sufficient to produce a concentration in the final solution of about 20 to about 35 percent at a temperature of below about 25° C., or preferably at about 0° C. In addition, it has been found that regardless of how much ammonia is employed, adding a sufficient amount of ammonium chloride to provide a 1.75 percent by weight concentration thereof in the final ammoniated solution enhances the recovery of potassium chloride. Thereafter the so precipitated solids are separated from the mother liquor as by filtration. After separating the precipitate, it is washed with water, preferably containing up to about 15 percent by weight ammonium hydroxide, the water or ammonium hydroxide washing solution being at about 25° C. to about 50° C. Under these preferred conditions, yields of from about 85 to about 90 percent of the available potassium chloride are obtainable having a purity after washing of from about 94 to about 98 percent or more.

Normally, the concentrated feed brines used in the present process should contain less than about 0.5 percent by weight of magnesium chloride. If said brines contain more than this amount, the quantity of the gelatinous magnesium hydroxide precipitate which forms during ammoniation significantly impairs the efficiency of the process by making separation of the potassium chloride, for example, by filtration, very difficult.

A convenient source of a feed solution of brine for use in the present invention from which to recover potassium chloride is the effluent brine generated as a filtrate in a process whereby the magnesium chloride content of various inland brines, such as, for example, Monroe brine, a naturally occurring brine obtained from wells located at and around Monroe, Michigan, is converted to magnesium hydroxide using slaked dolomite leaving a residual magnesium chloride content of less than about .06 percent. The calcium chloride-rich filtrate so generated is normally discarded despite its valuable potassium chloride content for want of a suitable recovery process. A typical analysis of such a filtrate brine, the bromine content having been removed, shows that it comprises by weight of about 22.5 percent calcium chloride, about 1.5 percent potassium chloride, about 5.2 percent sodium chloride, and about 1.0 percent of other alkali and alkaline earth salts including about 20 parts per million rubidium chloride, the balance being water.

Normally, in concentrating the above-described filtrate brine which initially has a specific gravity of from about 1.23 to about 1.25, the specific gravity increases to between about 1.35 to about 1.50 at a temperature of about 100° C. Thus concentrated, the brine is cooled and filtered to remove precipitated sodium chloride and other solids, if any, and adjusted to an apparent pH of from about 5 to about 7, if necessary, using hydrochloric acid. The so-prepared brine is then introduced into an ammoniation reactor to precipitate the potassium chloride therefrom in accordance with the present invention.

During ammoniation of the concentrated feed brine, said feed brine having been discharged from the evaporator at a temperature, for example, of about 80° C. as in the case of the above-described filtrate brine, cooling is accomplished concurrently with the addition of ammonia to a temperature within the above stated range. Cooling to temperatures down to about 25° C. can normally be accomplished by using a coolant of tap water, whereas, for lower temperatures a conventional refrigeration unit or Dry Ice (solid carbon dioxide) may be employed.

Generally, in order to obtain the preferred ammonia concentration, as stated above, during ammoniation of the concentrated feed brine, a pressurizable closed vessel capable of withstanding up to about 60 p.s.i.g. or more is used in order to confine the ammonia in said feed brine. It should be understood, however, that the pressure generated during ammoniation is a function of the degree of ammoniation and temperature employed.

The solid potassium chloride precipitate recovered from the aforementioned resulting ammoniacal slurry during ammoniation of the concentrated feed brine is normally separated from the mother liquor by filtering under pressure so as to prevent loss of ammonia. A thermal stripping device, maintained at atmospheric or less than atmospheric pressures, may be employed to release and remove by heating the ammonia content of the mother liquor filtrate. The so-released ammonia is then collected, compressed with cooling and recycled for use again in the reactor. The filtrate so-denuded of ammonia having no further use in the process of the present invention may then be discarded.

The washings obtained upon purifying the initially recovered potassium chloride are preferably recycled to the aforementioned stripper and then directed to the evaporator for concentrating to recover the potassium chloride content thereof in accordance with the present invention.

Normally, the concentrated feed brine as it discharges from the evaporator is filtered to remove, in addition to any crystallized sodium chloride, grit or undissolved material therefrom, before being introduced into the ammoniator.

The following examples serve to further illustrate the application and operation of the present invention.

*Example I*

A quantity of the aforementioned filtered brine having a specific gravity of about 1.245 and containing about 22.5 percent calcium chloride, about 1.51 percent potassium, and about 5.14 percent sodium chloride, the balance being water, was concentrated by evaporation at about 120° C. to a solution containing 39.4 percent calcium chloride and containing about 2.9 precent potassium chloride, having a specific gravity of about 1.45 at 25° C. After filtering, about 1000 grams of the so-concentrated solution was adjusted ot a pH of about 7 as measured by a MacBeth pH meter and introduced under a partial vacuum to facilitate flow into a pressure reactor for subsequent ammoniation. Agitation in the reactor was produced by two oppositely moving electrically driven paddles. Temperatures were determined using a conventional thermocouple and recording device. The reactor was immersed in a cooling bath, the coolant being circulated therein and cooled when needed by a refrigeration device. Gaseous ammonia was then introduced by bubbling it into the reactor at a rate of about 3.5 grams per minute until about 437 grams had been added, thereby producing an ammoniacal aqueous slurry containing about 30 percent ammonia and solid potassium chloride suspended in an ammoniacal calcium chloride rich mother liquor. During ammoniation, a pressure of about 10 p.s.i.g. was generated in the closed reactor. The system was then allowed to come to equilibrium by letting stand for about 30 minutes at 25°_C. followed by pressure filtering to separate the potassium chloride precipitate in the resulting slurry from the mother liquor. About 83 percent of the available potassium chloride was recovered having a purity of about 85 percent. The purity of the so-recovered potassium chloride was then increased to about 94 percent by washing with a dilute 15 percent aqueous $NH_4OH$ solution at about 25° C.

We claim:

1. A process for recovering solid potassium chloride from water-soluble compositions containing potassium chloride and calcium chloride which comprises, admixing sufficient ammonia with an aqueous solution of the composition containing the potassium chloride to be recovered, at a temperature within the range of from about 50° C. to about minus 70° C., to produce an ammoniacal slurry containing solid potassium chloride thereby precipitated from the solution, the ammoniacal slurry having a concentration by weight of from about 10 to about 40 percent ammonia, and separating the solid potassium chloride from the so-formed slurry, thereby recovering solid potassium chloride.

2. The process of claim 1 including the step of washing the recovered potassium chloride.

3. The process of claim 2 wherein the washing is done with water at a temperature of from about 25° C. to about 50° C.

4. The process of claim 3 wherein the wash water contains up to about 15 percent by weight of ammonium hydroxide.

5. The process of claim 1 wherein the aqueous mixture containing the potassium chloride to be recovered contains at least 1.0 percent by weight of potassium chloride and at least 20 percent by weight of calcium chloride.

6. A process for recovering solid potassium chloride from water-soluble compositions containing at least about 1.0 percent by weight of potassium chloride and at least 20 percent by weight calcium chloride which comprises, admixing sufficient ammonia with an aqueous mixture containing the potassium chloride to be recovered, at a temperature of from about 50° C. to about minus 70° C., to produce a slurry containing a precipitate containing solid potassium chloride and an ammoniacal solution having a concentration by weight of from about 10 to about 40 percent ammonia, separating the precipitate containing solid potassium chloride from the so-formed slurry, and washing the so-recovered precipitate with an aqueous washing solution containing up to about 15 percent by weight ammonium hydroxide, said washing solution being at a temperature within the range of from about 25° C. to about 50° C.

7. The process of claim 6 wherein the separation is by filtration.

8. A process for recovering solid potassium chloride from an aqueous solution saturated with respect to calcium chloride and containing at least 1.0 percent by weight of dissolved potassium chloride which comprises, admixing sufficient ammonia with the aqueosu solution, at a temperature of from about 0° C. to about 25° C., together with a sufficient amount of ammonium chloride to produce a slurry comprising solid precipitated potassium chloride and an ammoniacal solution having a concentration by weight of from 20 to about 35 percent of ammonia and about 1.75 percent by weight of ammonia chloride, separating the so-precipitated solid potassium chloride from the so-formed slurry, thereby recovereing the solid potassium chloride, and washing the so-recovered solid potassium chloride with water containing up to about 15 percent by weight ammonium hydroxide.

9. The process of claim 8 wherein separation of the precipitated solid potassium chloride from the slurry is by filtration.

References Cited by the Examiner

UNITED STATES PATENTS

| 1,510,046 | 9/24 | Dolbear | 23—300 |
| 1,593,038 | 7/26 | Gilsbee | 23—300 |
| 1,924,503 | 8/33 | Lambert | 23—89 |
| 1,976,222 | 10/34 | Hara | 23—89 |
| 2,029,623 | 2/36 | Kircher | 23—312 |

FOREIGN PATENTS

| 331,236 | 6/30 | Great Britain. |

OTHER REFERENCES

Chemical Abstracts, volume 52, #9, May 10, 1958, page 6896, g, h.

NORMAN YUDKOFF, *Primary Examiner.*

UNITED STATES PATENT OFFICE
CERTIFICATE OF CORRECTION

Patent No. 3,212,863                                        October 19, 1965

Robert D. Goodenough et al.

It is hereby certified that error appears in the above numbered patent requiring correction and that the said Letters Patent should read as corrected below.

Column 2, line 2, for "motor" read -- mother --; line 51, after "Likewise," insert -- when employing concentrations of over about 40 percent --; column 3, line 11, for "of", second occurrence, read -- or --; column 4, lines 14 and 15, after "potassium" insert -- chloride --; line 39, for "25°-C." read -- 25° C. --.

Signed and sealed this 20th day of September 1966.

(SEAL)
Attest:

ERNEST W. SWIDER                             EDWARD J. BRENNER
Attesting Officer                                Commissioner of Patents